United States Patent [19]
Fly

[11] 3,880,988
[45] Apr. 29, 1975

[54] METHOD OF IMPROVING ANTI-RH TYPING SERUM

[75] Inventor: Thomas W. Fly, Santa Ana, Calif.

[73] Assignee: Baxter Laboratories, Inc., Morton Grove, Ill.

[22] Filed: Mar. 10, 1972

[21] Appl. No.: 233,810

[52] U.S. Cl. ................................................ 424/11
[51] Int. Cl. ............................................ G01n 33/16
[58] Field of Search ........................................ 424/11

[56] References Cited
UNITED STATES PATENTS
2,770,572   11/1956   Eldon.................................... 424/11
3,652,761   3/1972   Weetall................................ 424/11

OTHER PUBLICATIONS

Merck Index, 7th Ed., (1960), p. 901.

*Primary Examiner*—Stanley J. Friedman
*Attorney, Agent, or Firm*—Scott J. Meyer; Louis Altman

[57] ABSTRACT

An improved anti-Rh slide typing serum containing resorcinol and dextran which provides increased avidity without causing non-specificity of reaction.

4 Claims, No Drawings

METHOD OF IMPROVING ANTI-RH TYPING SERUM

This invention relates to an improved anti-Rh slide typing serum.

The discovery of the Rh factor and recognition of its anti-genicity in the human has led to the importance of Rh blood typing procedures in medical practice. Although the Rh factor was later found to be a somewhat complex blood group system, in the primary sense those individuals whose blood cells react with Rh antibody are termed Rh positive, while those that do not react are called Rh negative. For convenience and rapidity, the Rh typing test is carried out on a microscope slide in a conventional procedure known as the Rh slide typing test.

Various manufacturers have developed special antiserum which contains Rh antibodies. This anti-serum will be referred to hereinafter as anti-Rh slide typing serum. Other than the sample of the patient's blood, this anti-serum is the primary material for use in the Rh slide typing test.

In order to produce a competitive product and conserve expensive anti-serum, manufacturers of anti-Rh slide typing serum generally add a potentiating substance to their product. This additive usually is polyvinylpyrrolidone (PVP), although dextran, gum acacia, and Ficoll are frequently used also. *Bibliotheca Haematol.* 23 (pt. 4), 802–13 (1965); British Patent 1,086,271. Each of these additives has the property of increasing the agglutination tendency of red blood cells during the test. However, each of these additives also works non-specifically; that is, the tendency to agglutinate is increased in positive and negative reactions equally. Positive reactions can be made to occur more rapidly with a better end point; yet above a certain concentration, negative reactions appear granular and the end point is therefore in doubt. Since a compromise must be reached between speed (avidity) and non-specificity (granularity), the full advantage of chemical potentiation has not been utilized heretofore.

Since a manufacturer is limited in the amount of exogenous materials which can be added to his product, avidity can be increased only by using extra anti-serum or a more potent anti-serum. This is a costly procedure since anti-serum is the most expensive raw material employed in the test. The cost of raw anti-serum in each liter of product generally ranges from about $50 to about $1,500, depending upon the scarcity of the particular anti-serum used. On the other hand, the cost of the additive in each liter of product does not generally exceed about 50 cents. In short, were it not for the property of the generally used additives to cause non-specific reactions, more additives and less anti-serum would be used to make these products.

Accordingly, it is an object of the present invention to provide an improved anti-Rh slide typing serum.

It is a further object of this invention to provide an anti-Rh slide typing serum containing a specific agglutination enhancer.

It is another object of this invention to provide an anti-Rh slide typing serum containing an additive which increases the avidity of the Rh slide typing test without causing substantial nonspecificity of reaction.

These and other objects of the invention will be apparent to those skilled in the art after reading the disclosure hereof.

In brief, the present invention comprises the addition of resorcinol (m-dihydroxybenzene) to the anti-Rh slide typing serum. This anti-serum preferably also contains dextran. With this combination of materials in the anti-serum, it has been found that avidity is significantly and substantially increased in the Rh slide typing test without causing non-specificity of reaction.

The amount of resorcinol in the anti-serum preferably is from about one to about 50 grams per liter and the amount of dextran preferably is from about one to about 10 grams per liter.

The dextran employed herein is a long chain glucose polymer $(C_6H_{10}O_5)_n$ having an average molecular weight of from about 10,000 to several million. Illustrative of the dextrans which can be used in the practice of the present invention are dextrans described, for example, in U.S. Pat. Nos. 2,310,263; the dextrans 2,437,518; 2,664,815; 2,708,174; 2,709,150; 2,712,007; 2,716,484; 2,717,853; 2,798,065; and British Patent 675,025. A preferred dextran has an average molecular weight of about 100,000 to about 500,000.

The anti-Rh slide typing serum which is used as the starting material in the practice of the invention can be obtained by any conventional means such as, for example, by immunization of male patients according to the procedure described by A. Wiener, *Amer. J. Clin. Path.* 17, 67–70 (1947).

In preparation of the anti-Rh slide typing serum for use in this invention, it is preferable to first remove any lipid material that is in the anti-serum. This can be done by conventional means such as by filtration of lipid particulate matter, separation by admixture with colloidal silicic acid, or solvent fractionation with a known lipid solvent.

In the practice of the invention it is preferred to incorporate the resorcinol in the anti-Rh slide typing serum in the following manner: Resorcinol is first dissolved in a physiological saline solution (0.9% NaCl) and then a 30 percent albumin solution is mixed with the saline-resorcinol. The albumin-saline-resorcinol solution is mixed with the anti-serum and then the dextran is added to this mixture. The albumin and antiserum proportions can range from about 2 to about 4 parts of albumin solution to 1 part of anti-serum, although 3 parts of albumin are preferred. The total protein in the anti-Rh slide typing serum contributed by these two components ranges from about 20 to about 26 gram percent (gm. percent).

The following examples will further illustrate the invention although the invention is not limited to these specific examples.

EXAMPLE 1

A batch of raw anti-Rh serum (available commercially under the National Institutes of Health minimum requirements for anti-Rh typing serum, 2d revision, May 25, 1949, Sections 1 and 2) is treated for the removal of lipids. In this procedure, 140 ml. of an aqueous solution of sodium chloride (13.5% NaCl) is admixed with 500 ml. of the anti-serum. To this mixture, a fused silica sold by Cabot Chemical Company under the trade name "CAB-O-SIL" is added at the rate of 2 grams per hundred ml. of solution.

The mixture is stirred for about 30 to 60 minutes and then is allowed to settle for about 2 to 24 hours at room temperature. The mixture is centrifuged and the precipitate discarded. The supernatant is filtered through asbestos filter pads and then dialyzed against a sodium chloride solution to bring the sodium chloride concentration to 0.9 percent weight per volume. Sodium azide is then added to the solution as a preservative agent in the amount of one gram per each liter. Trisodium ethylenediamenetetra-acetic acid (NaEDTA) is then added as an anticoagulant at the rate of 2 grams per liter of the solution.

Resorcinol is then mixed with a physiological saline solution in the amount of 12 grams of resorcinol in 60 ml. of saline. Nine-hundred and forty ml. of 30 percent bovine albumin is then dissolved in the saline-resorcinol mixture and the resulting mixture is stirred for 30 minutes to provide complete dissolution of the precipitate which forms.

The thus prepared solution is then mixed with the anti-serum in a ratio of 3 parts of albumin to 1 part of serum. Dextran 500 (Pharmacia; M.W. 500,000) is then added to the mixture in an amount of 5 grams per liter of solution to form the improved anti-Rh slide typing serum of this invention.

EXAMPLE 2

The anti-Rh slide typing serum prepared in Example 1 is used in the anti-Rh slide typing test as follows:

A suspension of cells is prepared by pouring off enough serum from freshly drawn clotted blood to make an approximate 50 percent cell suspension and stirring with applicator sticks to break up the fibrin clot. Cells from unclotted specimens can also be used in the same concentration.

Then one drop of the anti-Rh slide typing serum is placed near the center of a clean, flat glass slide on an illuminated viewer warmed 40° to 60° C. Warming of the slide is desirable for proper agglutination. Two drops of the 50 percent cell suspension are then placed next to the serum using applicator sticks or a pipet. The cells and the anti-Rh slide typing serum are carefully mixed. At 10 second intervals the slide is tilted so that most of the liquid accumulates at one end of the slide, then returned slowly to the horizontal position. The direction of the tilting is changed each time. The slide is examined for microscopic agglutination which appears within about 30 seconds and is complete in about 2 minutes. Agglutination indicates that the blood specimen is positive, and absence of agglutination, negative, to the Rh antibody present in the serum. Use of the anti-Rh slide typing serum of Example 1 in this test produces a substantial increase in avidity without causing non-specificity of reaction whereas use of a similar anti-Rh slide typing serum but without the resorcinol, causes non-specificity. In representative tests, avidity was increased up to 50 percent without causing non-specificity by use of the anti-Rh slide typing serum of Example 1.

Various other examples and modifications of the foregoing examples will be apparent to those skilled in the art after reading the foregoing specification and the appended claims without departing from the spirit and scope of the invention. All such variations and modifications are included within the scope of the claims appended hereto.

What is claimed is:

1. A method of improving anti-Rh slide typing serum whereby avidity of the Rh slide typing test is increased without causing substantial non-specificity of reaction comprising admixing in the serum from about one to about 50 grams per liter of resorcinol in a saline-albumin medium.

2. The method of claim 1 in which the serum also contains from about one to about 10 grams per liter of dextran having an average molecular weight of from about 10,000 to about 500,000.

3. An anti-Rh slide typing serum comprising anti-Rh serum in which the potential avidity of reaction is increased by admixing said serum with from about one to about 50 grams per liter of resorcinol.

4. The anti-Rh slide typing serum of claim 3 containing additionally from one to about 10 grams per liter of dextran having an average molecular weight of from about 10,000 to about 500,000.

* * * * *